G. G. PERCIVAL.
Electric Battery.
No. 53,668.
Patented April 3, 1866.
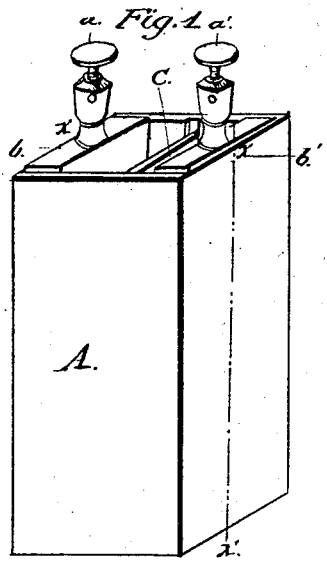
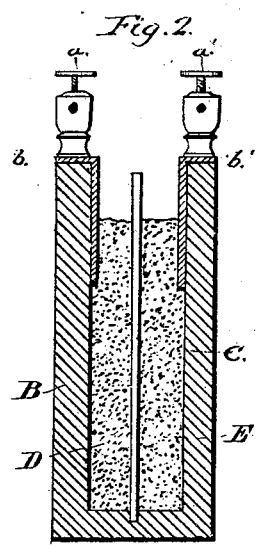
Witnesses:
Wm H Cooper. M.D.
W. B. Maloney. M. D.
Inventor:
Geo. G. Percival. M.D.

UNITED STATES PATENT OFFICE.

GEORGE G. PERCIVAL, OF BROOKLYN, NEW YORK.

IMPROVEMENT IN SECONDARY ELECTRIC PILES.

Specification forming part of Letters Patent No. 53,668, dated April 3, 1866; antedated March 9, 1866.

*To all whom it may concern:*

Be it known that I, GEORGE G. PERCIVAL, M. D., of Brooklyn, in the county of Kings and State of New York, have invented a new and useful Improvement in Secondary Piles; and I do hereby declare that the following is a full, clear, and exact description of the same, reference being had to the accompanying drawings, forming a part of this specification, in which—

Figure 1 is a perspective view of an apparatus constructed according to my invention. Fig. 2 is a transverse section through $xx$, Fig. 1.

Similar letters of reference indicate corresponding parts in the two figures.

The object of this invention is to obtain a cheap and efficient form of a secondary pile or condenser for voltaic electricity; and the invention consists in substituting layers of pulverized gas-carbon or some other conducting-powder separated by a layer or plate of some porous substance for the metallic plates of which the electrodes of the pile are ordinarily formed.

To enable others skilled in the art to make and use my invention, I will proceed to describe its construction and operation.

A is a simple secondary pile consisting of one pair. It is composed of a water-tight wooden box, B, divided in its center by a porous partition, C. On each side of this partition is a layer of powdered gas-carbon, D and E. These constitute the two electrodes of the pile, and when in use are wet by a proper solution—*e. g.*, dilute sulphuric acid. For convenience in establishing connection with these layers, there is on each end of the box a screw-cup, $a$, fastened to a slip of copper, $b$. This slip of copper is in contact with the carbon.

To use, we connect the poles of any battery or electromotor of sufficient intensity with the two screw-cups $a\ a'$, letting the connection remain till the pile is charged. The time required will depend upon the relative size of the plates in the battery and pile. Of course these layers may be placed in a horizontal position, and a layer of some non-conducting powder may be substituted for the porous plate.

Lead or any other suitable metal in the form of a coarse powder may be substituted for the gas-carbon.

I do not claim, broadly, the secondary pile, but only that modification of it in which, to save expense and increase the efficiency, the electrodes are formed of layers of pulverized gas-carbon or some other conducting-powder separated by a porous layer.

I claim as my invention and desire to secure by Letters Patent—

The forming of the electrodes of a secondary pile of layers of gas-carbon or some other conducting-powder, substantially as and for the purpose hereinbefore described.

GEO. G. PERCIVAL.

Witnesses:
W<small>M</small>. H. COOPER,
W. B. MALONEY.